(12) United States Patent
de Pinho et al.

(10) Patent No.: US 11,577,488 B2
(45) Date of Patent: Feb. 14, 2023

(54) COMPOSITE STRUCTURE FOR AN AIRBAG COVER, AND SEWN PRODUCT OF THE COMPOSITE STRUCTURE

(71) Applicant: TMG—Tecidos Plastificados e Outros Revestimentos Para a Indústria Autómovel, S.A., V.N. Famalicão (PT)

(72) Inventors: Elizabete de Pinho, Oporto (PT); Luis Filipe Silva, Braga (PT); Valério Gonçalves, Póvoa de Lanhoso (PT); Julia Burk, Oberhausen (DE); Tom Marquart, Landshut (DE)

(73) Assignee: TMG—Tecidos Plastificados e Outros Revestimentos Para a Indústria Autómovel, S.A., V.N. Famalicão (PT)

( * ) Notice: Subject to any disclaimer, the term of this patent is extended or adjusted under 35 U.S.C. 154(b) by 0 days.

(21) Appl. No.: 16/976,193

(22) PCT Filed: Feb. 19, 2019

(86) PCT No.: PCT/EP2019/054114
§ 371 (c)(1),
(2) Date: Aug. 27, 2020

(87) PCT Pub. No.: WO2019/166287
PCT Pub. Date: Sep. 6, 2019

(65) Prior Publication Data
US 2021/0001594 A1   Jan. 7, 2021

(30) Foreign Application Priority Data

Mar. 1, 2018   (EP) ..................... 18159410

(51) Int. Cl.
*B32B 5/24*    (2006.01)
*B32B 7/09*    (2019.01)
(Continued)

(52) U.S. Cl.
CPC .............. *B32B 5/245* (2013.01); *B32B 5/022* (2013.01); *B32B 5/024* (2013.01); *B32B 5/026* (2013.01);
(Continued)

(58) Field of Classification Search
CPC .......... B32B 5/245; B32B 5/026; B32B 5/18; B32B 27/08; B32B 27/12; B32B 27/304;
(Continued)

(56) References Cited

U.S. PATENT DOCUMENTS 6,084,048 A * 7/2000 Hozumi ................ C08F 210/08
526/348.6
6,132,539 A   10/2000 Laurent et al.
(Continued)

FOREIGN PATENT DOCUMENTS

CN    102951112 A    3/2013
DE    10244311 A1    4/2004
(Continued)

OTHER PUBLICATIONS

Espacenet Translation of EP-0844142-A1 (Year: 2021).*
(Continued)

*Primary Examiner* — Michael Zhang
(74) *Attorney, Agent, or Firm* — Duane Morris LLP

(57) ABSTRACT

The present invention provides a composite structure, a method for its manufacture, a sewn product containing the composite structure, and a method for manufacturing the sewn product. The composite structure comprises a foam layer, a textile layer, a cover layer and a lacquer layer in this order, wherein the foam layer has a density of at most 300 kg/m³ and contains a polyolefin, the cover layer is thermoplastic and comprises at least two compact sublayers of
(Continued)

different composition, each sublayer containing at least one thermoplastic selected from polyolefin and polyvinyl chloride.

11 Claims, 1 Drawing Sheet

(51) Int. Cl.
| | |
|---|---|
| *B32B 5/02* | (2006.01) |
| *B32B 5/18* | (2006.01) |
| *B32B 27/06* | (2006.01) |
| *B32B 27/12* | (2006.01) |
| *B32B 27/30* | (2006.01) |
| *B32B 27/32* | (2006.01) |
| *B32B 37/15* | (2006.01) |
| *B32B 38/06* | (2006.01) |
| *B60R 21/215* | (2011.01) |
| *B32B 27/08* | (2006.01) |

(52) U.S. Cl.
CPC ............... *B32B 5/18* (2013.01); *B32B 7/09* (2019.01); *B32B 27/065* (2013.01); *B32B 27/08* (2013.01); *B32B 27/12* (2013.01); *B32B 27/304* (2013.01); *B32B 27/32* (2013.01); *B32B 37/153* (2013.01); *B32B 38/06* (2013.01); *B60R 21/215* (2013.01); *B32B 2255/10* (2013.01); *B32B 2255/26* (2013.01); *B32B 2266/025* (2013.01); *B32B 2307/536* (2013.01); *B32B 2307/582* (2013.01); *B32B 2605/08* (2013.01)

(58) Field of Classification Search
CPC . B32B 27/32; B32B 2255/26; B32B 2255/10; B32B 2266/025; B32B 2307/536; B32B 2605/08; B60R 21/2165
See application file for complete search history.

(56) References Cited

U.S. PATENT DOCUMENTS

| | | |
|---|---|---|
| 6,794,025 B1 | 9/2004 | Laurent et al. |
| 8,807,590 B2 | 8/2014 | Wisniewski et al. |
| 9,260,577 B2 | 2/2016 | Sieradzki et al. |
| 2002/0106530 A1* | 8/2002 | Ishibashi ............... C07C 211/54 428/690 |
| 2002/0135162 A1* | 9/2002 | Muller ................ B60R 21/2155 280/728.3 |
| 2007/0052210 A1* | 3/2007 | Schweizer ............. B32B 27/40 280/728.3 |
| 2013/0049335 A1 | 2/2013 | Wisniewski et al. |
| 2013/0280517 A1* | 10/2013 | Buehring .................. B32B 5/20 428/304.4 |
| 2017/0136732 A1 | 5/2017 | Huelsewede et al. |
| 2019/0023215 A1* | 1/2019 | Huelsewede ......... B32B 27/365 |

FOREIGN PATENT DOCUMENTS

| | | | |
|---|---|---|---|
| EP | 0844142 A1 * | 5/1998 | ......... B60R 21/2165 |
| EP | 0844142 A1 | 5/1998 | |

OTHER PUBLICATIONS

Response submitted to European Patent Office in reply to EPO Communication under Rule 69 EPC dated Nov. 26, 2019, for corresponding European Patent Application No. 18159410.2.
Chinese Patent Office, Office Action issued in corresponding Chinese Patent Application No. 201980026102.1 dated Jan. 4, 2022.

* cited by examiner

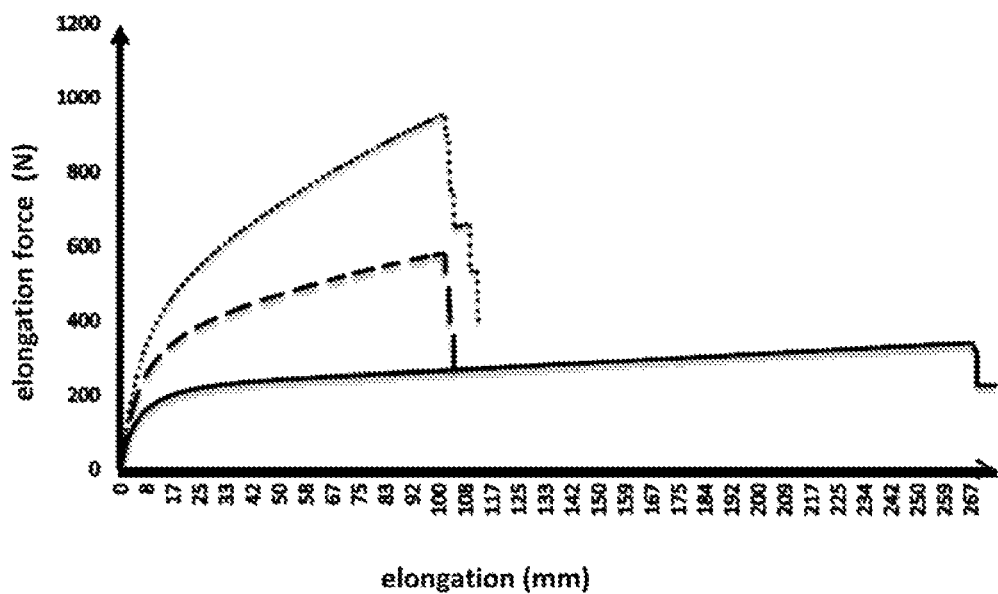

COMPOSITE STRUCTURE FOR AN AIRBAG COVER, AND SEWN PRODUCT OF THE COMPOSITE STRUCTURE

FIELD OF THE INVENTION

The present invention relates to a composite structure as a cover for an airbag cover, a sewn product and a process for producing the composite structure and the sewn product.

STATE OF THE ART

Airbags are integrated in various places in motor vehicles, for example in steering wheels, instrument panels, doors, seats and roof linings. For the airbag to function reliably, it is necessary for the plastic carrier to have one or more material weaknesses in all its layers, so-called predetermined breaking points, which define the airbag's firing channel. In the area of the covers of an airbag, it is common practice to provide the cover of the airbag in the area of the airbag flap with a so-called tear seam so that it can open unhindered in the event of an impact and the airbag can deploy.

However, for visual reasons or embodiment reasons, car manufacturers are increasingly demanding that, for example, the passenger airbag, which is integrated into the dashboard, be invisible on the side facing the occupant. For this purpose, the dashboard with the integrated airbag flap is provided with a cover without a tear seam.

However, this coating must have a material weakening in the area of the airbag flap so that a safe airbag deployment, i.e. the safe opening of the airbag flap and the deployment of the airbag in the event of an impact, is guaranteed. The opening of the cover during the airbag shot along the material weaknesses must also take place within a specified time window. Uncontrolled particle flight caused by flying fragments of the cover must also be avoided at all costs.

Film materials can be used as an alternative to airbag cover covers with material weakening. These film materials must show the required tearing behaviour, whereby the airbag must be deployed within defined time limits, particle flight must be avoided and passenger protection must be guaranteed.

In the case of slush or sprayed skin, the produced skin is back-foamed with a foam. This foam is simultaneously bonded to a stable carrier part. In these constructions, when an airbag is opened, the airbag flap is driven by the bag against the foam, which breaks in the process. In the further course of the process, the flap meets the compact inner layer of the two-layer compact film construction, which does not break immediately due to its significantly higher strength and extensibility, but is first stretched.

PVC or PUR materials are used as dashboard covers for luxury vehicles. Spacer materials are usually used as a haptic layer. Recently, so-called "multitear" spacer materials have been developed that can be used for airbag covers without weakening the material.

The use of foam laminates for airbag covers is described in DE 10 2014 213 974 A1. The foam film laminate described there comprises a compact cover layer and a foam layer with a density of at least 350 kg/m³ on the underside of the cover layer, the cover layer having an outer layer and an inner layer.

The use of film laminates for airbag covers is also described in DE 10 2016 206 340 A1. The film laminate described there comprises a compact cover layer and a foam layer with a thickness in the range of 0.5 to 4 mm and a density of 40 to 200 kg/m³ on the underside of the cover layer, whereby the cover layer can be embodimented in two layers.

A disadvantage of these composite structures is the considerable formation of wrinkles, making them difficult to handle during processing, especially when sewing.

Problems to be Solved by the Invention

The state of the art does not disclose any composite structures which on the one hand have good properties as airbag covers, especially tearing properties, without a material weakening, and on the other hand are soft and flexible, so that they are advantageous in terms of haptics and handling during processing. In particular, the composite structures should be easy to sew.

Therefore, the problem underlying the present invention is to provide a composite structure and a sewn product with an excellent combination of properties, such as tearing properties and haptics, while at the same time improving wrinkle formation and handling during processing, especially during sewing.

SUMMARY OF THE INVENTION

The task was solved by providing a composite structure and a sewn product according to the enclosed patent claims.

The subject-matter of the present invention is in particular the following:

[1] A composite structure comprising a foam layer, a textile layer, a cover layer and a lacquer layer in this order, the foam layer having a density of at most 300 kg/m³ and containing a polyolefin, the cover layer being thermoplastic and comprising at least two compact sublayers of different composition, each sublayer containing at least one thermoplastic selected from polyolefin and polyvinyl chloride.

[2] The composite structure according to [1], which is suitable as a tearable coating for an airbag cover without a material weakening.

[3] The composite structure according to [1] or [2], wherein the polyolefin of the foam layer contains a polypropylene or consists of polypropylene.

[4] The composite structure according to any of the foregoing points, wherein the textile layer has a thickness of 0.05 to 2 mm.

[5] The composite structure according to one of the foregoing points, which has a Shore A hardness according to DIN 53505 of 20 to 45.

[6] The composite structure according to any of the foregoing points, wherein the foam layer has a gel content of 20 to 80%.

[7] The composite structure according to any of the foregoing points, wherein the thickness of the foam layer is 1 to 5 mm and the thickness of the cover layer is 0.2 to 1 mm.

[8] The composite structure according to any of the foregoing points, wherein the foam layer consists of sharpened foam.

[9] A process for producing a composite structure according to any one of points [1] to [8], wherein the sublayers of the cover layer contain thermoplastic polyolefin, the process comprising the following steps:
  (i) coextruding the sublayers of the cover layer,
  (ii) lacquering the cover layer,
  (iii) hot-melt bonding of the cover layer and the foam layer to the textile layer and,
  (iv) if the composite structure has a grain, embossing the structure, wherein the steps are performed in the order indicated or in the order of (i), (iii), (ii) and (iv).

[10] The process for producing a composite structure according to any one of points [1] to [8], wherein the sublayers of the cover layer contain thermoplastic polyvinyl chloride, the process comprising the following steps:
  (i) providing the textile layer with laminated sublayers of the cover layer
  (ii) lacquering of the cover layer,
  (iii) if the composite structure has a grain, embossing the structure; and
  (iv) hot-melt bonding the foam layer to the textile layer.

[11] A sewn product obtainable by sewing at least two layers of the composite structure according to any one of points [1] to [8].

[12] The sewn product according to [11], wherein the product is obtainable by folding the composite structure, placing the foam layers together and sewing the two parts of the composite structure in the contact area.

[13] The sewn product according to [11] or [12], wherein the thickness of the foam layer in the area of the seam has been reduced before sewing.

[14] The use of a composite structure according to any one of points [1] to [8] or a sewn product according to any one of points [11] to [13] as a coating material for a component in the interior of a vehicle.

Advantages of the Invention

The composite structure according to the invention exhibits a tear behavior that meets the requirements for airbag opening without a material weakening of the composite structure or decorative material. On the one hand, this avoids a visible weakening line, which is considered a flaw in the design.

The main advantage, however, is that the manufacturing costs can be reduced. The composite structure as invented represents a cost-effective alternative to the high-priced PVC or PUR materials with spacer materials. In particular, the sewability of the composite structure in accordance with the invention enables it to be used as an alternative to the materials mentioned. Thus, the composite structure according to the invention can also be used in luxury class vehicles.

The composite structures according to the invention have a low wrinkle formation when bent. This makes them easier to handle and, in particular, facilitates sewing.

Due to the special multi-layer structure, the composite structures according to the invention have further properties that are advantageous when sewing. These properties are, in particular, seam strength, i.e. a high stitch tear-out force, as well as a high tear propagation resistance.

Due to the low thickness of the outer compact layer, the material base in this layer can be selected to meet specific requirements such as surface resistance, gloss, grain appearance, ageing resistance and the like.

A further advantage is the easy recyclability of the composite structure according to the invention when a polyolefin foam and a thermoplastic polyolefin are used as the cover layer, since they belong to the same compound family.

DESCRIPTION OF THE FIGURE

FIG. 1 shows the results of elongation at break tests of composite structures according to the invention (example 1: dashed line; example 2: dotted line) and a composite structure of the state of the art (C212: solid line).

EMBODIMENTS OF THE INVENTION

The composite structure according to the invention comprises a foam layer, a textile layer, a cover layer and a lacquer layer in this order, wherein the foam layer has a density of at most 300 kg/m$^3$ and contains a polyolefin, preferably polypropylene, the cover layer is thermoplastic and comprises at least two compact sublayers of different composition, each sublayer containing at least one thermoplastic selected from polyolefin and polyvinyl chloride.

Preferred is a composite structure comprising a foam layer, a textile layer, a cover layer and a lacquer layer in this indicated order, the foam layer being based on polypropylene and having a density of at most 300 kg/m$^3$, the cover layer being thermoplastic and comprising three compact sublayers of different composition, each sublayer comprising at least one thermoplastic selected from polyolefin and polyvinyl chloride, wherein,
(a) if all three sublayers contain or consist of a thermoplastic polyolefin, the one closest to the textile layer, i.e. the inner, sublayer of the cover layer and the outer sublayer have the same composition and the middle sublayer has a different composition, or,
(b) if all three sublayers contain or consist of a thermoplastic PVC, no adhesive is present between the textile layer and the outermost layer.

In embodiment (b), the PVC layer in contact with the textile layer serves as an adhesive layer.

Most preferably, the composite structure according to the invention comprises a polypropylene-based, sharpened foam layer having a thickness of 1.0 to 5.0 mm, a textile layer having a thickness of 0.05 to 1.0 mm, a cover layer having a thickness of 0.2 to 1.0 mm and a lacquer layer having a thickness of 1 to 30 μm in this order, wherein the foam layer has a density of 50 to 100 kg/m$^3$, the cover layer is thermoplastic and comprises at least two compact sublayers of different composition, each sublayer containing at least one thermoplastic selected from polyolefin and polyvinyl chloride, the composite structure having a Shore A hardness of 20 to 45 and optionally an elongation at break of 80 to 220%.

The composite structure according to the invention is preferably suitable as a tearable coating for an airbag cover. The term "suitable as a tearable coating for an airbag cover" means that the composite structure of the invention is located in an area of the airbag cover where the predetermined breaking point of the cover is located. When the airbag is triggered, i.e. when the airbag is fired, this predetermined breaking point breaks and causes the composite structure according to the invention to tear.

In order for the composite structure according to the invention to have the desired properties, e.g. easy processability when sewing, the composite structure must not be too hard. The Shore A hardness of the composite structure according to the invention is therefore preferably 20 to 45 and more preferably 30 to 45.

The composite structure according to the invention preferably has no material weakening. The term "material weakening" can mean any physical weakening and can refer, for example, to an area where material has been removed to form predetermined breaking lines, or a tear seam or perforation line. The composite structure according to the invention is preferably "without a material weakening", i.e. the said weakening of the material is not present in the composite structure according to the invention.

In order to prevent impairment of airbag deployment or so-called ballooning, it is preferable that all layers of the composite structure tear as simultaneously as possible. The elongation at break (according to ISO 1421) of the composite structure according to the invention is preferably between 60 and 250%, more preferably between 80 and 220% and even more preferably between 100 and 200%. Preferably the elongations at break of the other layers of the composite structure are in the same range, the difference between the elongation at break of each layer and the elongation at break of the composite structure being less than 50% more preferably less than 20% and even more preferably less than 10%.

According to ISO 2411, the adhesive force between the individual layers is preferably so high that it is not possible to separate two layers, i.e. cover layer and textile layer as well as textile layer and foam layer, without destroying the layers. In particular, it is preferred that separation of the foam layer from a textile layer bonded to it is not possible without destroying the foam layer (foam splitting). This goal can be achieved by the appropriate selection of the type of adhesive that bonds the foam layer to the textile layer.

For suitability for sewing, it is important that the composite structure according to the invention has a suitable stitch tear-out force. This is preferably at least 40 N according to DIN EN ISO 23910.

Foam Layer

The foam layer contains polyolefin foam or consists of polyolefin foam. The polyolefins described below in relation to thermoplastic polyolefins can be used in this foam. The foam layer consists of or contains polypropylene foam (PP foam) in a preferred embodiment. Polypropylene (PP) is understood here to be such polymers or copolymers whose weight proportion of propylene is >50% by weight.

The polyolefin of the foam layer may contain common additives, such as lubricants, stabilizers, fillers, such as inorganic fillers, and/or pigment.

The thermoplastic polyolefins (TPO) described below in relation to the cover layer can also be used for the foam layer.

The preferred polypropylene may be selected from the group consisting of polypropylene, polypropylene-ethylene copolymer, metallocene polypropylene, metallocene polypropylene-ethylene copolymer, polypropylene-based polyolefin plastomer, polypropylene-based polyolefin elastoplastomer, polypropylene-based polyolefin elastomer, polypropylene-based polyolefin elastomer, polypropylene-based thermoplastic polyolefin blend and polypropylene-based thermoplastic elastomer blend.

Polypropylene-based thermoplastic polyolefin blend is homopolypropylene and/or polypropylene-ethylene copolymer and/or metallocene homopolypropylene.

The thickness of the foam layer is preferably 1.0 to 5.0 mm, more preferably 2.0 to 5.0 mm and even more preferably 3.0 to 4.5 mm. The density of the foam layer is preferably less than 300 kg/m$^3$, more preferably less than 200 kg/m$^3$ and even more preferably less than 100 kg/m$^3$. The density of the foam layer is particularly preferred in a range from 30 to 300 kg/m$^3$, more preferably 30 to 150 kg/m$^3$ and even more preferably 40 to 100 kg/m$^3$.

The higher the density of the foam, the higher its strength. In order for the foam layer to exhibit the properties desired for the invention, the preferred values of the density and the thickness of the foam layer correlate. Overall, however, the foam layer has a very low density. This is also reflected in the product of the density (in kg/m$^3$) and the thickness (in mm) of the foam layer. This product is preferably 100 to 300, more preferably 150 to 250.

A measure of the softness of the foam layer is the gel content. The gel content is an indication of the degree of cross-linking of the polymer. The lower the gel content, the softer the foam layer. The foam layer used in the composite structure according to the invention has a gel content of preferably 20 to 80%, more preferably 30 to 60% and even more preferably 40 to 60%.

The foamed layer is preferably formed by foam extrusion. In this process, the layer of foamed plastic is produced in that the plastic melt is loaded during the extrusion process above the melting temperature with a blowing agent under excess pressure, in particular an inert gas, by blowing it in, and this gas-laden melt is then expanded on leaving the extrusion unit and cooled below the melting temperature. The layer of foamed plastic is thus produced by blowing a blowing agent under positive pressure into a plastic melt during the extrusion process and by subsequently releasing the blowing agent under positive pressure. The blowing agent can be e.g. $H_2O$ or inert gases, possibly in combination with each other. In order to achieve pronounced foam formation, an inert gas is advantageously used as the blowing agent or a blowing agent containing an inert gas is used. All inert gases known to the specialist can be used as inert gases in the process, whereby $CO_2$ or $N_2$ have proven to be particularly advantageous with regard to price, environmental compatibility and foaming behaviour. The foam material can then be bonded, e.g. thermally or by gluing, to the compact two-layer cover layer in the form of a flat material, so that a multi-layer plastic film with a foamed layer is produced. It is also possible to first bond the foam layer to the inner layer and then apply the outer layer to the inner layer.

The foam contained in the foam layer can be open-cell or closed-cell. Especially when PP foam is produced as sheets, the cell structure on the surfaces differs from the rest of the homogeneous structure. In particular, the surfaces have harder, closed-cell areas. This results in different physical properties, for example different elongation and flexibility, but also different haptics. By so-called skiving of the lower and/or upper surface layer of the sheet, it is possible to obtain a sheet that contains the homogeneously cell-structured core area of the foam. This process results in a so-called sharpened foam. The sharpening can be limited to one or more areas, e.g. the edges, of the sheet or can cover the entire sheet. The foam sheet is sharpened in such a way that, for example, at least 2%, 5%, 10% or 20% of the thickness of an area or the entire sheet is removed on one or both surfaces, with preferred areas being 2 to 20% or 5 to 15% on one or both surfaces. The sharpened sheet then has a thickness of preferably 1 to 5 mm. This makes the feel of the later foam film much softer and the material is easier to handle during the production process of the sewing dresses and during lamination. The foam can be sharpened before the composite structure is formed, whereby one or both surfaces can be sharpened. It is preferable to sharpen both surfaces fully. After bonding the foam to the cover layer or to the textile layer, it can be sharpened on the still free surface.

The use of sharpened foam with an open-cell surface also has the advantage that in the area of connection with another layer, the material of this other layer or the adhesive can penetrate into the open cells and a stronger connection can be achieved by the anchoring obtained in this way.

Sharpening in the seam area can be carried out with a sharpening machine, e.g. FORTUNA NG6 (rotating bell knife with adjustable knife speed).

This method also has a very positive influence on the avoidance of creases when handling the material in the sewing process. The sharpening process in the seam area is also necessary in order to be able to fold over and topstitch the seam lugs and to reduce or avoid the associated thickening of the material. For example, the foam layer can be reduced to half the original thickness. In the seam area of two composite structures or two parts of a composite structure, the reduction in foam thickness is preferably such that the thickness in the seam area does not differ from the thickness in the adjacent, non thickness-reduced area or is at most 50%, preferably at most 30%, more preferably at most 20% and even more preferably at most 10% greater.

The properties of the composite structure have been selected in such a way that sufficient seam strength according to DIN ISO 23910 is achieved without having to use an extra sewing aid, e.g. a thin textile. The seam strength is determined by the thickness and the structure of the composite structure, among other things.

The foam layer, for example, has a thickness of 3.5 mm. The cover layer, for example, has a thickness of 0.5 mm. The total thickness is therefore 4.0 mm. If the total thickness is to be retained when the seam lug of a composite structure is folded over, 4.0 mm must be removed in this area. This can be achieved by removing 2.0 mm of the foam layer so that the foam layer has a thickness of only 1.5 mm. If this area is folded over, a total thickness of the foam of 3.0 mm remains in the overlap area, so that the properties of the composite structure in this area and the properties of the composite structure in other areas are at least similar.

It is particularly preferred that a sewn product according to the invention contains a foam layer which has been subjected to a full-surface sharpening of at least one surface, in particular of both surfaces. Even more preferred is a foam layer which has been subjected both to a full-surface sharpening of both surfaces and a sharpening in the seam area.

Examples of polyolefins and their production are disclosed in U.S. Pat. No. 9,260,577B2.

These polyolefins comprise 15 to 75 parts by weight of an olefin block copolymer and 25 to 85 parts by weight of a propylene-based polymer and have a degree of crosslinking of 20 to 75%. These polyolefins preferably contain closed cells.

For example, the degree of crosslinking may be 30 to 50%, with crosslinking being carried out with 3 to 4 parts by weight of divinylbenzene crosslinker per 100 parts by weight of resin.

These polyolefins, which can be produced according to U.S. Pat. No. 9,260,577B2, for example, have the following properties:

|  | Properties of preferred polyolefins | Properties of particularly preferred polyolefins | Properties of very particularly preferred polyolefins |
| --- | --- | --- | --- |
| Compressive strength according to JIS K6767 [kgf/cm$^2$] | 0.2-1.0 | 0.3-0.6 | 0.75-0.85 |
| Density [kg/m$^3$] according to JIS K6767 | 20-250 | 30-100 | 65-75 |
| Shore A according to ASTM D2240 | 30-90 | 45-65 | 70-75 |
| VDA 237-101 Section (Appendix) 1 | 1.0-3.2 | 1.0-2.8 | 2.3-2.5 |

The standards listed in the above table and their implementation are explained in U.S. Pat. No. 9,260,577B2.

Cover Layer

The cover layer is thermoplastic. It contains a thermoplastic polyolefin (TPO) and/or a thermoplastic polyvinyl chloride (PVC). Preferably, the cover layer consists of a TPO or PVC. The expression that a layer "contains" TPO or PVC means that it preferably consists of at least 30% by weight of TPO or PVC, more preferably at least 50% by weight and even more preferably 100%. The expression that a layer is "based" on TPO or PVC means that it consists of at least 50%, preferably 100%, by weight of TPO or PVC.

The cover layer has at least two sublayers. If there are two or three sublayers, the sublayer closest to the foam layer is called the inner sublayer. Correspondingly, the sublayer closest to the lacquer layer is called the outer layer. If there are three sublayers, the intermediate sublayer is referred to as the middle sublayer.

Preferably, the cover layer comprises two or three sublayers.

The cover layer consists of or contains a thermoplastic selected from TPO and/or PVC. The thermoplastic is contained in at least one of the sublayers and preferably in all sublayers. If both TPO and PVC are present, they may be present in the same sublayer or in different sublayers.

The connection between the outer layer, the middle layer and the inner layer can be made in the usual way, e.g. thermally or by bonding.

Preferably, the Shore A hardness of the cover layer is 90 or less, more preferably 85 or less in the case of a polyolefin-based cover layer, and 60 or less, more preferably 50 or less in the case of a PVC-based cover layer. A range of 75 to 95 is preferred for a polyolefin-based cover layer, more preferably 75 to 85. A range of 30 to 60 is preferred for a PVC-based cover layer, and 30 to 50 is more preferred for a PVC-based cover layer.

With two sublayers, the material composition of the layer material for the outer layer and that of the layer material for the inner layer is different. This can be achieved, for example, by varying the type and/or proportions of the polymers used and/or varying the quantity and/or type of additives, especially fillers. In the case of three or more layers, the material composition of adjacent layers is different. Therefore, for example, with three layers, the inner and outer layers can have the same composition.

The thickness of the cover layer is preferably 0.2 to 1 mm, more preferably 0.2 to 0.7 mm and even more preferably 0.3 to 0.6 mm. The sublayers can have the same or different thickness. In one embodiment, the outer layer can be thicker than the inner layer in two layers.

With two sublayers of TPO, both have a thickness of preferably 100 to 400 μm, more preferably 100 to 250 μm. With three sublayers, all preferably have a thickness of 70 to 250 μm, more preferably 100 to 200 μm.

With two sublayers of PVC, both have a thickness of preferably 100 to 500 μm. With three sublayers, all preferably have a thickness of 100 to 600 μm, more preferably 150 to 500 μm. If the PVC sublayer bonded to the textile layer serves as an adhesive layer, this layer is preferably 20 to 80 μm thick, and the other two PVC sublayers are preferably 100 to 600 μm thick, more preferably 150 to 500 μm thick.

The cover layer is compact. In particular, the cover layer is not foamed. The density of the cover layer is preferably higher than 800 kg/m$^3$ and more preferably higher than 850 kg/m$^3$. This applies to each sublayer independently. The structure according to the invention contains at least two compact sublayers in the cover layer. This means that each of the two sublayers has a density of preferably higher than 800 kg/cm$^3$.

As for the foam layer, the gel content of the cover layer is a measure of the softness of the layer. The cover layer used in the composite structure according to the invention has a gel content of preferably 0 to 20% more preferably from more than 0% to at most 20%. In a polyolefin-based cover layer, the gel content is particularly preferably 3 to 20% or 5 to 20%. In a PVC-based cover layer, the gel content is preferably 1 to 10% or 1 to 5%.

TPO

The cover layer, which is used in the composite structure according to the invention, contains or consists of thermoplastic polyolefin.

Thermoplastic polyolefins (TPO) are polyolefins are polymers produced from alkenes such as ethylene, propylene, 1-butene or isobutene by chain polymerization. They are semi-crystalline thermoplastics that are easy to process.

Examples of TPO are polyethylene (PE), polypropylene (PP), polymethylpentene (PMP), polyisobutylene (PIB) and polybutylene (PB, polybutene-1).

Polyethylene (PE) is understood here to be such polymers or copolymers whose weight proportion of ethylene is >50% by weight. Polypropylene (PP) is understood here to be those polymers or copolymers whose proportion of propylene by weight is >50%.

Examples of TPO are mixtures of polyethylene (PE) and polypropylene (PP).

Examples of PE are HDPE, LDPE and LLDPE. HDPE has weakly branched polymer chains and therefore has a high density between 0.94 g/cm$^3$ and 0.97 g/cm$^3$, with a stress at the yield point of 20.0 to 30.0 N/mm$^2$ and an elongation of 12% at the yield point. LDPE has highly branched polymer chains and therefore low density between 0.915 g/cm$^3$ and 0.935 g/cm$^3$, with a stress at the yield point of 8.0 to 10.0 N/mm$^2$ and an elongation of 20% at the yield point. LLDPE is a linear low density polyethylene whose polymer molecules have only short branches and has a yield stress of 10.0 to 30.0 N/mm$^2$ and an elongation of 16% at the yield point.

The properties of TPO can be influenced by adding elastomers or other substances such as talcum.

Depending on its composition, TPO can be produced hard or soft. Hard TPO, for example, consists of 75% PP and talcum. Soft TPO has a significantly higher elastomer content, sometimes up to 70%.

Thermoplastic elastomers can be added to adjust the properties. These are also thermoplastics, which behave rubber-elastically in the range of usual service temperatures, but can be processed like thermoplastics at higher temperatures. A distinction is made between copolymers and elastomer alloys. Copolymers are statistical copolymers or block copolymers, which consist of a main polymer such as polyethylene, whose degree of crystallization is reduced to a certain extent by a randomly incorporated comonomer such as vinyl acetate. In block copolymers, the hard and soft segments in a molecule are sharply separated (e.g. SBS, SIS). Copolymers can therefore consist of a soft elastomer and a hard thermoplastic component.

Elastomer alloys are blends of finished polymers. The desired properties can be obtained by varying the mixing ratios and additives. For example, a polyolefin elastomer made of polypropylene (PP) and natural rubber (NR) covers a wide range of hardness depending on the ratio of quantities.

Examples of TPO are blends of ethylene-propylene-diene rubber (EPDM) with polyethylene (PE) and/or polypropylene (PP), blends of ethylene-propylene rubber (EPM) with polypropylene (PP) and/or polyethylene (PE) and ethylene-propylene blends.

The remarks on polypropylene in this section apply not only to the cover layer, but equally to the PP foam layer.

PVC

The cover layer used in an embodiment in the composite structure according to the invention contains or consists of thermoplastic polyvinyl chloride (PVC). The properties of PVC are adjusted by adding plasticizers. The addition of plasticizers gives the polymer plastic properties such as yielding and softness. Plasticizers include phthalic acid esters, chloroparaffins, adipic acid esters, phosphoric acid esters acetyltributyl citrate and 1.2-cyclohexanedicarboxylic acid diisononyl ester. PVC may contain up to 40% plasticizers.

PVC can be mixed with additives to improve its physical properties, such as toughness and elasticity, and to enhance processability. Examples of such additives are stabilizers and impact modifiers.

For example, PVC without plasticiser can have an elongation at break/tensile strength at break (according to DIN 53455) of 10 to 50%, while PVC can have an elongation at break/tensile strength at break (according to DIN 53455) of 170 to 400%, depending on the structure and quantity of plasticiser.

If the inner cover layer is a PVC layer, it can also serve as an adhesive to adhere to the textile layer.

Surface Lacquer

Surface lacquering serves to protect the artificial leather from chemical agents, physical damage, e.g. scratches or abrasion, and UV radiation. Surface lacquering can further reduce the surface adhesion of the artificial leather. Conventional lacquers can be used, which have proven their worth in the surface finishing of imitation leather for the interior of vehicles. For example, solvent- or water-based polyurethanes crosslinked with isocyanates or with UV-curing properties are suitable.

The surface lacquering is preferably applied continuously over the composite structure and covers it completely. The surface lacquering is formed from at least one lacquer layer, but may be formed from several lacquer layers, preferably from one to four lacquer layers.

The surface lacquering to protect the surface usually consists of one or more, preferably up to four, transparent layers of lacquer. However, in a variant of the invention, the surface lacquering may also be coloured, e.g. by adding colour pigments to the lacquer.

The surface lacquering is formed by applying a lacquer in one or preferably several coats. The lacquer is preferably applied by means of gravure printing, but can also be applied by other methods, such as roller application, spray application or in an embossing step for surface embossing.

In one version, the surface lacquering can be applied in the form of a lacquer layer in a two-stage roller printing process. The surface lacquering has a thickness in the range of a few micrometers, preferably 1 to 30 µm, more preferably 1 to 20 µm and even more preferably 3 to 10 µm.

The lacquer layer is preferably a polyurethane lacquer layer. An example of a surface lacquering is a lacquer based on a silicone-containing aliphatic polyurethane. This lacquer can be applied in a thickness of 5 µm, for example.

Graining

The composite structure preferably has a grain. The compact cover layer or outer layer of the cover layer preferably has a three-dimensionally structured surface on the top side, namely a so-called grain, which is possible in a wide variety of shapes and embodiments that can be used for decoration. The graining has heights and depths, whereby the thickness of the cover layer in the area of the heights differs from the thickness of the cover layer in the area of the depths, for example by at least 0.01 mm, by at least 0.05 mm, by at least 0.1 mm or by at least 0.5 mm.

The graining is covered with the lacquer layer. Depending on the manufacturing process, the grain can be present in the lacquer layer as well as in the cover layer. If the graining is carried out before the lacquering process, the depths of the grains are to some extent filled by the lacquering process. If the graining is carried out after lacquering, the graining is equally present in the lacquer and the cover layer.

The grain can be produced using conventional methods. The grain can be produced as a paper grain. For this purpose, the starting material is coated as a PVC or PU compound onto a structured carrier material, e.g. a release paper. Afterwards, the carrier paper is removed and the surface lacquering is applied in several steps by means of gravure printing. Alternatively, the graining or embossing is preferably applied to the artificial leather surface by means of an embossing roller while applying pressure and temperature after the lacquering. Due to the grain, the composite structure has areas of greater and lesser thickness.

Textile Layer

The textile layer contains or consists of a textile material. The textile material can be a woven fabric, a non-woven or a knitted fabric, for example. The textile material may, for example, be made of natural materials, such as cotton, or of chemical fibres made of natural and synthetic raw materials, such as polyamide, polyester, or glass fibres, but also of mixed forms of both materials, whereby a textile material made of polyester is preferred.

Advantageously, the textile material is a knitted or crocheted fabric, so that fully finished parts can be produced. This has the advantage that with the elasticity typical for knitted fabrics, the fully finished parts have an optimum fit so that they can be used without any further processing steps.

The textile layer can be bonded to the adjacent layers by means of adhesive. Preferably the textile layer is bonded to both the foam layer and the cover layer with an adhesive. If the sublayer of the cover layer adjacent to the textile layer is a PVC layer, there is no need for an adhesive between the textile layer and the cover layer. In this case, the PVC layer serves as the adhesive.

In order not to impair the penetration of the airbag, textile material with lower tear resistance is preferably used.

The thickness of the textile layer is preferably 0.05 to 2.0 mm, more preferably 0.1 to 1.0 mm and even more preferably 0.2 to 0.8 mm.

Adhesive

The adhesive used in the present invention is preferably a hot melt adhesive known and used in the state of the art. For example, the adhesive is used in a thickness of 40 μm.

A preferred hot melt adhesive is based on polyurethane (PUR).

The foam layer, cover layer and lacquer layer contained in the composite structure according to the invention can have adhesive properties so that they can adhere firmly to each other without the addition of another adhesive. The adhesive mentioned in the present invention therefore refers to a material which is different from the material of the respective layers involved in the composite structure according to the invention.

For example, if no adhesive is present in a composite structure between the foam layer and the cover layer, this means that no adhesive material is present that differs in composition from the material of the foam layer or cover layer.

If no adhesive is present in a composite structure between the textile layer and a PVC sublayer of the cover layer, this means that no adhesive material is present which differs in composition from the material of the textile layer or the PVC sublayer.

A preferred embodiment of the composite structure according to the invention comprises a foam layer, a cover layer and a lacquer layer in that order, with no adhesive between these structures.

Another preferred embodiment of the composite structure according to the invention comprises a foam layer, an adhesive layer, a textile layer, an adhesive layer, a cover layer and a lacquer layer in that order. If, in this embodiment, the cover layer contains a sublayer of PVC adjacent to the foam layer, the latter may serve as an adhesive layer.

EXAMPLES

The present invention is further illustrated by the following examples.

(a) Measurement Methods

In the present invention, the following measuring methods were used to determine the parameters of the composite structure:

(The norms and standards indicated in the present notification refer to the versions current at the time of notification, unless otherwise indicated)

Cover Layer
Thickness: ISO 1923
Weight ISO 2286-2:2016
Hardness: DIN 53505
Melting points (DSC): ASTM D 3418-15
Textile Layer
Weight: EN 40-339-02
Tear strength: DIN 53356
Elongation at break: ISO 13934-1:99
Foam Layer
Thickness: ISO 1923
Density: ISO 845
Melting point (DSC): ASTM D 3418-12
Composite Structure
Hardness (Shore A, ShA): DIN 53505
Wrinkle formation: A test piece of the composite material with a length of 7 mm and a width of 4.5 mm was folded with the foam side facing outwards and placed in a device used in a fracture resistance test according to VDA 230-225, then the wrinkled area was subjected to a load of 1.4 kg for one minute, the sample was taken, placed on a flat surface and then visually assessed to see whether the sample returned to its original state or whether a wrinkle remained.
Puncture test ISO 3303-1
Elongation at break: ISO 1421
Tear propagation strength: DIN 53356
Adhesion strength polymer/foam, polymer/textile and textile/foam: ISO 2411
Gel content Measurement of gel content is based on ASTM D2765-16. The composite structure material is weighed (initial weight) and immersed in xylene at 180° C. for 24 hours, after which the dissolved material is separated and the weight of the remaining material is determined (final weight); gel content [%]=[(final weight−initial weight)/initial weight)]×100

(b) Implementation of the Examples

Imitation leather of the composition given in Table 1 was produced.

The arrangement of the sublayers from top to bottom as shown in Table 1 corresponds to the arrangement from outside to inside in the composite structure, i.e. in the direction from the lacquer layer to the foam layer.

The structure of the artificial leather and its production are explained in more detail below for the composite structures of comparison example 1 and examples 1 and 2.

Comparative Example 1

The artificial leather of comparison example 1 has the following structure:
- layer 0: lacquer based on silicone-containing aliphatic polyurethane, approx. 5 µm thick
- Layer 1: compact TPO layer (approx. 130 µm layer thickness)
- Layer 2: compact TPO layer (approx. 130 µm layer thickness)
- Layer 3: compact TPO layer (approx. 130 µm layer thickness)
- Layer 4: polypropylene foam (3500 to 4000 µm layer thickness; sharpened foam)

Layers 1 to 3 correspond to layers AA-B in Table 1.

The composite structure can be produced by a process with the following steps:
(i) coextruding the TPO layers and thermal lamination to PP foam
(ii) lacquering the upper side and optionally the reverse side
(iii) embossing to form the grain
(iv) optionally lacquering the reverse side An alternative procedure includes the following steps:
(i) coextruding the TPO layers
(ii) lacquering the upper side
(iii) embossing to form the grain and lamination on PP foam
(iv) optionally lacquering the reverse side Example 1

The artificial leather of example 1 has the following structure:
- layer 0: lacquer based on silicone-containing aliphatic polyurethane, approx. 5 µm thick
- Layer 1: compact TPO layer (approx. 130 µm layer thickness)
- Layer 2: compact TPO layer (approx. 130 µm layer thickness)
- Layer 3: compact TPO layer (approx. 130 µm layer thickness)
- Intermediate layer hot melt adhesive, 40 µm thick
- Layer 4: 100% polyester textile, 400 to 600 µm thick
- Intermediate layer: hot melt adhesive, 40 µm thick
- Layer 5: polypropylene foam (3500 to 4000 µm layer thickness, sharpened foam)

Layers 1 to 3 correspond to layers A-B-A in Table 1.

The composite structure can be produced by a process with the following steps:
(i) coextruding the TPO layers
(ii) lacquering the upper side
(iii) hot melt bonding the TPO layers and the polypropylene foam to the polyester textile
(iv) embossing to form the grain
(v) optionally lacquering of the reverse side Step (v) can be performed before step (iv).

An alternative procedure includes the following steps:
(i) coextruding the TPO layers
(ii) hot melt bonding the TPO layers and the polypropylene foam to the polyester textile
(iii) lacquering the top and optionally the reverse side Example 2

The artificial leather of example 2 has the following structure:
- Layer 0: lacquer based on aliphatic polyurethane containing silicone, approx. 5 µm thick
- Layer 1: compact PVC layer (approx. 220 µm layer thickness) (PVC1)
- Layer 2: PVC foam layer (approx. 430 µm layer thickness) (PVC2)
- Layer 3: compact adhesive layer based on PVC (approx. 40 µm layer thickness) (PVC3)
- Layer 4:100% polyester textile, 400 to 600 µm thick
- Intermediate layer hot melt adhesive, 40 µm thick
- Layer 5: polypropylene foam (3500 to 4000 µm layer thickness; sharpened foam)

PVC3 serves as an adhesive layer.

Layers 1 to 3 correspond to layers PVC1 to PVC3 in Table 1.

The composite structure can be produced by a process with the following steps:
(i) covering the PVC layers and laminating the polyester textile
(ii) lacquering the upper side
(iii) embossing to form the grain
(iv) Hot melt bonding the polypropylene foam to the polyester textile
(v) optionally lacquering of the reverse side (c) Results The properties of these synthetic leathers with regard to creasing and suitability as airbag covers were investigated.

The wrinkling was determined under the following conditions:

Test 1: Wrinkle formation after 1-minute buckling at room temperature with a load of 1.4 kg.

Test 2: Wrinkle formation after each 1-minute buckling at room temperature and 90° C. at a load of 1.4 kg.

The grading of the wrinkling was done after bending in longitudinal, transverse and diagonal directions:

Grade 1: no or hardly visible wrinkling

Grade 2: hardly visible wrinkling

Grade 3: clearly visible wrinkling

The tearing properties of airbag shots were investigated at −35° C., 23° C. and 85° C.

In the examples and comparison examples, sublayers of thermoplastic polyolefin with the following Shore A hardnesses (ShA) were used: XAKU: ShA 71; XZCI: ShA 86; XAKY: ShA 77; XAKJ: ShA 86; XZTE: ShA 68.

Polyester (PES) was used as the textile layer and polypropylene (PP) as the foam layer.

The results are shown in Table 1.

TABLE 1

|  | Comparative Example | | | | | Example | |
| --- | --- | --- | --- | --- | --- | --- | --- |
|  | 1 | 2 | 3 | 4 | 5 | 1 | 2 |
| Arrangement of the sublayers of the cover layer (Shore A hardness) | AA-XAKU (71) | AA-XAKU (71) | AA-XAKY (77) | A-XAKJ (86) | A-XAKJ (86) | A-XAKJ (86) | PVC1 |
|  | B-XZCI (86) | B-XAKY (77) | B-XAKY (77) | B-XZTE (68) | B-XZTE (68) | B-XZTE (68) | PVC2 |
|  |  |  |  | A-XAKJ (86) | A-XAKJ (86) | A-XAKJ (86) | PVC3 |
| Total thickness [mm] of the cover layer | <0.40 | 0.40 | 0.40 | 0.50 | 0.50 | 0.50 | 0.70 |
| Textile layer | — | — | — | PES | — | PES | PES |
| Thickness [mm] of the foam layer (PP, 50 kg/m³) | 3.5 | 3.5 | 3.5 | — | 3.5 | 3.5 | 3.5 |
| Grading of wrinkling, test 1 | 2 | 2 | 2 | 2 | 1 | 1 | 1 |
| Grading of wrinkling, test 2 | 1 | 2 | 1 |  |  |  |  |
| Tearing properties at airbag firing | The samples were suitable for use in airbags; the products of Comparative Examples 2 and 3 tore late | | | | | | |

The products of the Examples 1 and 2 according to the invention and the Comparative Examples 1 to 3 and 5 fulfilled the following criteria of the airbag evaluation: particle flight, crack pattern of the surface, inflation behaviour of the airbag, flap movement, tear time and adhesion of the decoration to the carrier.

The product of Comparison Example 4 fulfilled the criteria for the airbag rating only by material weakness.

Further Tests

The composite structures of Examples 1 and 2 as well as the Comparative Example 1 were subjected to further investigations and comparisons with the composite structures C212 and PVC/Spacer of the state of the art.

C212

The artificial leather C212 has a material weakening introduced by laser treatment and has the following structure:
  layer 0: lacquer based on silicone-containing aliphatic polyurethane, approx. 5 μm thick
  Layer 1: compact TPO layer (approx. 190 μm layer thickness)
  Layer 2: compact TPO layer (approx. 190 μm layer thickness)
  Layer 3: compact TPO layer (approx. 190 μm layer thickness)
  Layer 4: polypropylene foam (2000 μm layer thickness; no sharpened foam)

The composite structure C212 can be produced by a process with the following steps:
  (i) coextruding the TPO layers and thermal lamination to PP foam
  (ii) lacquering the upper side and, if necessary, the reverse side
  (iii) embossing to form the grain
  (iv) optionally lacquering the reverse side Alternatively, the composite structure C212 is produced by the following process:
  (i) coextruding the TPO layers
  (ii) lacquering the upper side
  (iii) embossing to form the grain and thermal lamination to polypropylene foam
  (iv) optionally lacquering the reverse side PVC/Spacer The imitation leather PVC/Spacer has the following structure:
  layer 0: lacquer based on silicone-containing aliphatic polyurethane, approx. 5 μm thick
  Layer 1: compact PVC layer (approx. 230 μm layer thickness)
  Layer 2: compact PVC layer (approx. 230 μm layer thickness)
  Intermediate layer: hot melt adhesive, 40 μm thick
  Layer 3: spacer textile (3500 to 4000 μm layer thickness)

Results

The results are shown in Table 2.

TABLE 2

|  | Features | C212 | PVC/Spacer | Comparative Example 1 | Example 1 | Example 2 |
| --- | --- | --- | --- | --- | --- | --- |
|  | Structure (ShA) | AA-XAKJ (85) | — | AA-XAKU (71) | A-XAKJ (86) | PVC1 |
|  |  | B-XZCI (86) |  | B-XZCI (86) | B-XZTE (68) | PVC2 |
|  |  |  |  |  | A-XAKJ (86) | PVC3 |
| Cover layer | Thickness (mm) | 0.57 | 0.57 | 0.4 | 0.4 | 0.7 |
|  | Weight (g/m²) | 507 | — | 348 | 448 | 605 |
|  | Hardness (ShA) | 86 |  | 81 | 81 | 43 |
|  | Melting point (° C.) | Tf1 = 118 |  | Tf1 = 118 | Tf1 = 117 | gelation >182° C. |
|  |  | Tf2 = 162 |  | Tf2 = 160 | Tf2 = 162 |  |
|  | Gel content (%) | 24.5 | 1.84 | 15.6 | 5.6 | 1.55 |
| Adhesive | Type | — | — | — | PUR hot melt adhesive | — |
|  | Amount (gm²) |  |  |  | 40 |  |

TABLE 2-continued

| | Features | C212 | PVC/Spacer | Comparative Example 1 | Example 1 | Example 2 |
|---|---|---|---|---|---|---|
| Textile layer | Type | — | Spacer fabric | — | 100% PES | |
| | Weight (g/m²) | | | | 52 | |
| | Tensile strength warp/weft (N) | | 3.50-4.00 mm thick | | 161/146 | |
| | Tear propagation strength warp/weft (N) | | | | 17/20 | |
| | Elongation at break warp/weft (%) | | | | 176/113 | |
| Adhesive | Type | — | — | — | PUR hot melt adhesive | |
| | Amount (g/m²) | | | | 40 | |
| Foam layer | Thickness (mm) | 2.0 | — | | 3.5 | |
| | Weight (g/m²) | 134 | | | 175 | |
| | Density (kg/m³) | 67 | | | 50 | |
| | Gel content (%) | 65.3 | | | 56.5 | |
| | Melting point (° C.) | Tf1 = 121 Tf2 = 152 | | | Tf1 = 119 Tf2 = 145 | |
| Composite structure | Hardness (ShA) | 48 | 34 | 30 | 44 | 34 |
| | Tearing properties at airbag firing | * | ** | * | * | * |
| | Adhesion polymer/foam (N) | *** | — | *** | — | — |
| | Adhesion polymer/textile (N) | — | *** | — | *** | *** |
| | Adhesion textile/foam | — | — | — | *** | *** |
| | Grading of wrinkling, test 2 | 3 | 1 | 2 | 1 | 1 |

\* The samples were suitable for use as airbag covers at −35° C., 23° C. and 85° C.
\*\* No test possible
\*\*\* No separation of the layers possible without destruction of the layers, especially the foam layer (foam splitting)

FIG. 1 shows the excellent elongation properties at break of the composite structures of Examples 1 and 2.

What is claimed is:

1. A composite structure as a tearable coating for an airbag cover, the composite structure comprising a foam layer, a textile layer, a cover layer and a lacquer layer, the foam layer having a density of at most 300 kg/m³ and containing a polyolefin, the cover layer being thermoplastic and comprising at least two compact sublayers of different composition, each sublayer containing at least one thermoplastic selected from polyolefin and polyvinyl chloride, the composite structure comprising no material weakening forming a tear line, and wherein the composite structure is configured such that all its components are torn upon airbag deployment.

2. The composite structure according to claim 1, wherein the polyolefin of the foam layer contains a polypropylene or consists of polypropylene.

3. The composite structure according to claim 1, which has a Shore A hardness according to DIN 53505 of 20 to 45.

4. The composite structure according to claim 1, wherein the foam layer has a gel content of 20 to 80%.

5. The composite structure according to claim 1, wherein the thickness of the foam layer is 1 to 5 mm and the thickness of the cover layer is 0.2 to 1 mm.

6. The composite structure according to claim 1, wherein the foam layer consists of sharpened foam.

7. A sewn product obtainable by sewing at least two layers of the composite structure according to claim 1.

8. The sewn product according to claim 7, wherein the product is obtainable by folding the composite structure and sewing the two parts of the composite structure in a contact area.

9. The sewn product according to claim 7, wherein the thickness of the foam layer in the area of a seam has been reduced before sewing.

10. A process for producing a composite structure according to claim 1, wherein the sublayers of the cover layer contain thermoplastic polyolefin, the process comprising the following steps:
   (i) coextruding the sublayers of the cover layer,
   (ii) lacquering the cover layer,
   (iii) hot-melt bonding of the cover layer and the foam layer to the textile layer and,
   (iv) if the composite structure has a grain, embossing the structure, wherein the steps are performed in the order indicated or in the order of (i), (iii), (ii) and (iv).

11. The process for producing a composite structure according to claim 1, wherein the sublayers of the cover layer contain thermoplastic polyvinyl chloride, the process comprising the following steps:
   (i) providing the textile layer with laminated sublayers of the cover layer,
   (ii) lacquering of the cover layer,
   (iii) if the composite structure has a grain, embossing the structure; and
   (iv) hot-melt bonding the foam layer to the textile layer.

\* \* \* \* \*